United States Patent [19]

Ishida

[11] Patent Number: 4,948,254
[45] Date of Patent: Aug. 14, 1990

[54] LIGHT WAVE INTERFERENCE LENGTH-MEASURING APPARATUS

[75] Inventor: Akira Ishida, Tsukuba, Japan

[73] Assignee: Research Development Corporation of Japan, Tokyo, Japan

[21] Appl. No.: 256,942

[22] Filed: Oct. 13, 1988

[51] Int. Cl.$^5$ .............................................. G01B 9/02
[52] U.S. Cl. .................................................... 356/358
[58] Field of Search ........................................ 356/358

[56] References Cited

U.S. PATENT DOCUMENTS

| 4,377,036 | 3/1983 | Dangschat | 356/358 |
| 4,378,160 | 3/1983 | Vlad et al. | 356/358 |
| 4,643,577 | 2/1987 | Roeth et al. | 356/358 |

OTHER PUBLICATIONS

"Two-Laser Optical Distance-Measuring Instrument that Corrects for the Atmospheric Index of Refraction", Earnshaw et al, *Applied Optics*, Apr. 1972, vol. 11, No. 4, pp. 749–755.

*Primary Examiner*—Davis L. Willis
*Assistant Examiner*—Matthew W. Koren
*Attorney, Agent, or Firm*—Armstrong, Nikaido, Marmelstein, Kubovcik & Murray

[57] ABSTRACT

An apparatus for measuring displacement by light wave interference, wherein means are provided to determine true displacement in spite of atmospheric flicker in the light path. Two coherent light beams of different wavelengths are transmitted over a common path and reflected from a light reflector means, the displacement of which is to be measured. The reflected beams are separated and compared with reference beams to measure a phase difference for each reflected beam, and signal processing means is provided for calculating atmospheric flicker error from the phase differences, and for determining true displacement by taking the measured error into consideration.

5 Claims, 4 Drawing Sheets

LIGHT WAVE INTERFERENCE LENGTH-MEASURING APPARATUS

BACKGROUND OF THE INVENTION

1. Field of the Invention

The present invention relates to a light wave interference length-measuring apparatus, and more particularly to a light wave interference length-measuring apparatus which can remove measuring errors caused by a flicker of the atmosphere.

2. Description of the Prior Art

The measuring method utilizing a light wave interference has been extensively used as a highly precise measuring means, and many apparatuses are available in markets. A reference unit of the measuring according to this method is a wavelength of light. If the wave length is varied, the measuring precision is directly affected thereby, and therefore, it is important to maintain stability of the wave length in order to maintain the measuring precision.

However, where the measurement is effected in the atmosphere, the wave length is varied due to the flicker (including those caused by a change in weather as taken in terms of macroscopic changes to fine wind) of the atmosphere, resulting in the occurrence of measuring errors. This comprises a common drawback of a light wave interference measuring method. To cope with the macroscopic change in weather, it is possible to monitor the conditions of atmosphere such as atmospheric pressure, temperature, humidity and the like and correct a variation in wave length by calculation or other means. Apparatuses having such a processing function as described have been marketed.

As for the microscopic flicker, it is difficult to monitor the atmospheric conditions at various positions of a light path in real time, and therefore satisfactory correction of the wave length cannot be carried out. In the field of measurement of long distance, an attempt has been reported in which more than two different wave lengths are used, and the dispersion characteristics of the atmosphere are utilized to correct the measuring errors caused by the flicker of the atmosphere. According to the aforesaid proposal, the light intensity is modulated by a microwave, which is extremely complicated in construction and is not suitable for measurement of a short distance.

SUMMARY OF THE INVENTION

The present invention overcomes these disadvantages noted above with respect to prior art. It is an object of the present invention to provide a light wave interference measuring apparatus for measuring a short distance, which can remove irregularly varying measuring errors resulting from a flicker of the atmosphere to obtain a true measured amount in real time.

A light wave interference measuring apparatus according to the present invention comprises a measuring optical system for simultaneously obtaining measured data of the same object by a light wave interference using two different wave lengths, and a signal processing means for calculating measuring errors caused by a flicker of the atmosphere from the measured data of the aforesaid two wave lengths and the scattering characteristics of the atmosphere to remove the aforesaid errors from said measured data.

First, the principle of the present invention will be described hereinafter.

FIG. 1 shows a basic construction of a light wave interferometer for the interference measurement. A light from a continuous coherent light source incident upon a half mirror (a semi-transparent mirror) 3 is divided into two parts, one being incident upon a movable mirror 1 for measurement while the other incident upon a fixed mirror 2 which are re-flected, and they are interfered with each other via the half mirror 3 as a measuring light and a reference light, respectively, to form an interference fringe. A change in brightness and darkness of the interference fringe is detected as a phase change $\delta$ on the basis of a displacement of the movable mirror 1 by a photo detector 4 and a signal processing system 5. A displacement $X_D$ of the movable mirror 1 is calculated by the following formula:

$$X_D = \frac{\delta}{2\pi} \cdot \frac{\lambda}{2} = \frac{\delta\lambda}{4\pi} \quad (1)$$

wherein:
$X_D$: Displacement of the movable mirror 1 including an error
$\delta$: Phase change measured
$\lambda$: Light-source wave length.

In FIG. 1, two photo detectors 4 are symmetrically arranged through the half mirror 3 to discriminate the moving direction of the movable mirror 1.

The phase change $\delta$ measured as described above includes, in addition to the phase change $\alpha$ resulting from a true displacement of the movable mirror 1, a phase variation due to a fine displacement of the fixed mirror 2 and the half mirror 3, a phase variation due to a variation in frequency of a light source itself, and a phase variation caused by flicker or the like of the atmosphere of a light path. $X_D$ calculated by the formula (1) includes errors caused thereby.

Where the main cause of an error is limited to the flicker of the atmosphere, the phase change $\delta$ is expressed by the following formula (2).

$$\delta = \alpha + \beta \quad (2)$$

wherein:
$\delta$: Phase change measured
$\alpha$: Phase change caused by movement of the movable mirror 1
$\beta$: Phase change caused by the flicker of atmosphere
$\alpha$ and $\beta$ are the function of a light source frequency as shown in Formula (3).

$$\alpha \propto \omega$$
$$\beta \propto 1/(\omega_0^2 - \omega^2) \quad (3)$$

where $\omega_0$ is a constant that is determined by the medium of the light path The following can be written from Formulae (2) and (3).

$$\begin{aligned} \delta(\omega) &= \alpha(\omega) + \beta(\omega) \\ &= P\omega + Q x \frac{1}{\omega_0^2 - \omega^2} \end{aligned} \quad (4)$$

Phase changes $\delta a$ and $\delta b$ with respect to two different wave lengths $\delta a$ and $\delta b$ (respective frequencies $\omega a$ and ωb) are used to obtain P and Q in Formula (4), and α(ωa) obtained therefrom is used to obtain a true displacement $X_A$ of the movable mirror 1 is obtained from Formulae (1) and (2) as given by:

$$X_A = \tfrac{1}{4}\pi\{\lambda a\, \delta a - (\lambda a\, \delta a - \lambda b\, \delta b)/(1 - W)\} \quad (5)$$

$$W \approx (\omega o^2 - \omega a^2)/(\omega o^2 - \omega b^2) \quad (6)$$

That is, the true displacement $X_A$ of the movable mirror 1 is obtained from two measured values $\delta a = \delta(\omega a)$ and $\delta b = \delta(\omega b)$ and Formulae (5) and (6).

DETAILED DESCRIPTION OF THE PREFERRED EMBODIMENTS

Figure 2:
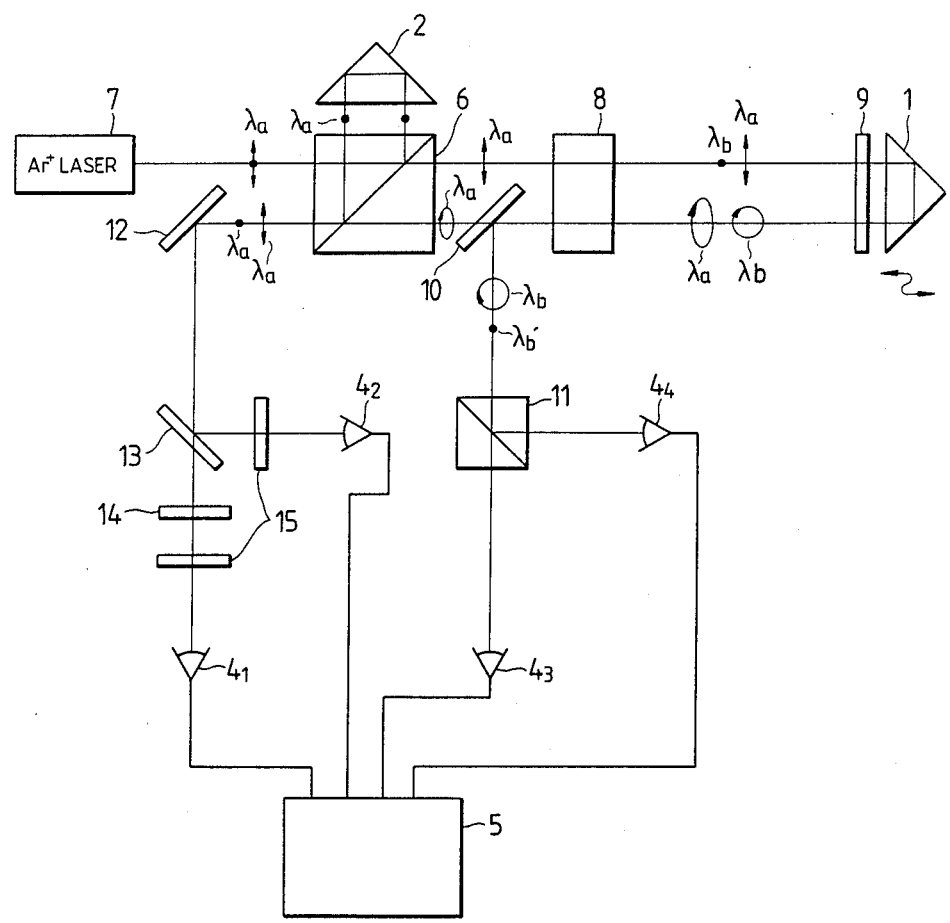
FIG. 2 shows a light path of a two-wavelength light wave interference measuring apparatus according to one embodiment of the present invention.

One embodiment of the apparatus according to the present invention for realizing the principle will be described hereinafter. FIG. 2 shows a light path of this embodiment, in which for two different wavelengths, for example, an output light ($\lambda a = 488$ nm) from an Ar+ laser light source 7, and a second higher harmonic wave ($\lambda b = \lambda a \times \tfrac{1}{2} = 244$ nm) of a basic wave $\lambda a$ from the laser light source 7 formed by a non-linear optical system 8 composed of a non-linear optical crystal (for example, $\beta - B_aB_2O_4$) and a condenser system are used.

This apparatus comprises, as shown in FIG. 2, a polarizing beam splitter 6 for transmitting a P plane of polarizing (a polarization being parallel to the paper surface) component of a beam from a light source 7 to reflect an S polarizing (a plane of polarization being perpendicular to the paper surface) component, a fixed mirror 2 for reflecting the beam reflected at the polarizing beam splitter 6 in an original direction, a non-linear optical system 8 for passing a part of the P polarization having been transmitted through the polarizing beam splitter 6 and converting the remaining part into a second higher harmonic wave of S polarization, a movable mirror 1 for reflecting the beam having been transmitted through the non-linear optical system 8 in an original direction, a 1/9 wavelength plate 8 arranged in front of the movable mirror 1 to act as a ⅛ wavelength plate with respect to the second higher harmonic wave, a mirror 10 for transmitting a basic wave component among the beam having been transmitted through the non-linear optical system 8 after being reflected at the movable mirror 1 to reflect the second higher harmonic component, a polarizing beam splitter 11 for dividing a beam formed into a circular polarization by passing through the ⅛ wavelength plate 9 twice forward and backward among the second higher harmonic wave component reflected at the mirror 10 into two components perpendicularly intersecting each other and dividing the beam converted into the second higher harmonic wave of S polarization by the non-linear optical system in the return path into two components perpendicularly intersecting each other, photo-detectors $4_3$ and $4_4$ for detecting interference fringes formed by the beam divided into two parts by the polarizing beam splitter 11, a total reflection mirror 12 for reflecting a beam having been transmitted through the mirror 10 and having passed through the polarizing beam splitter 6 and a beam, from the fixed mirror 2, reflected by the polarizing beam splitter 6, a beam splitter 13 for dividing the beam reflected by the total reflection mirror 12 into two parts, a ¼ wavelength plate 14 for imparting a phase change of ¼ to one of the beams divided into two parts by the beam splitter 13, polarizers 15 for passing components perpendicularly intersecting each other of said beams divided into two parts, photo-detectors $4_1$ and $4_2$ for detecting interference fringes formed through the polarizers 15, and a signal processing system 5 for processing signals from the detectors $4_1$ to $4_4$ to calculate a displacement $X_A$ in accordance with Formulae (5) and (6).

According to this apparatus, errors caused by the flicker of atmosphere between the non-linear optical system 8 and the movable mirror 1 are corrected as will be described hereinafter.

Figure 1:
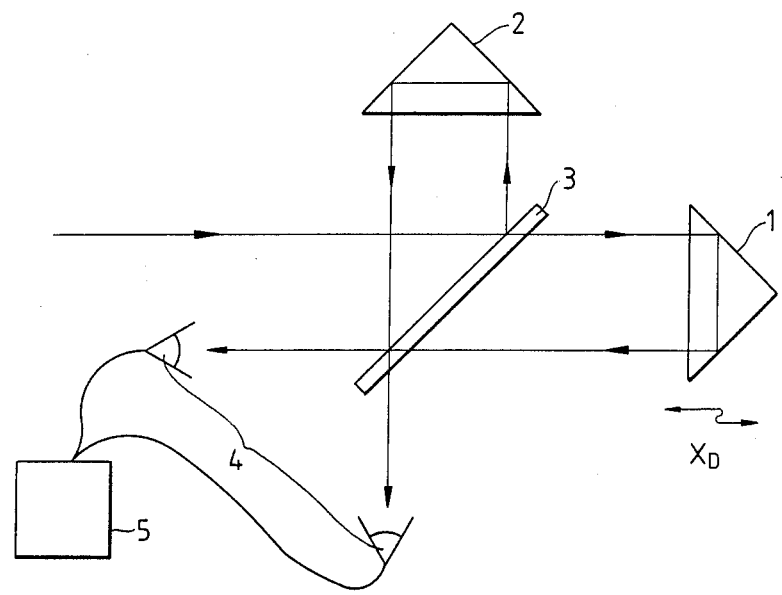
FIG. 1 is a structural view showing a basic construction of a light wave interferometer.
Figure 3:
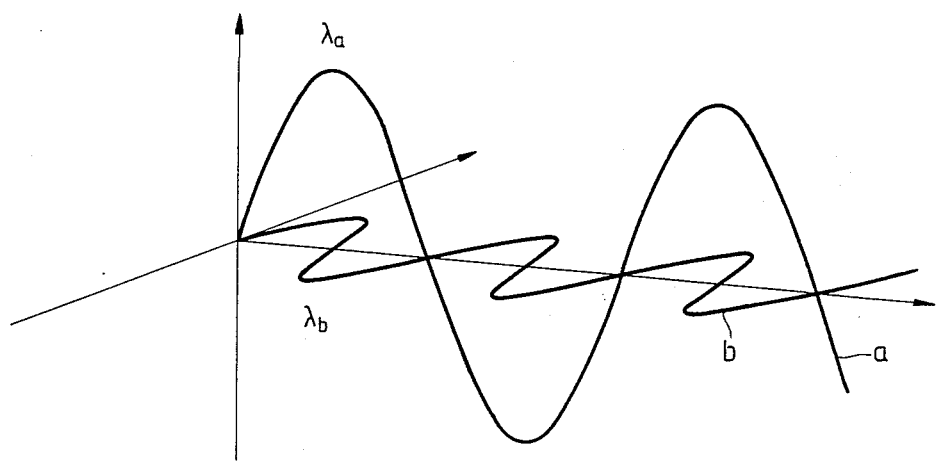
FIG. 3 is an exaplanatory view of a phase relationship between a basic wave and a higher harmonic wave.

The output beam from the Ar+ laser 7 is a linear polarized light (If this light is divided by component, a P polarized light and an S polarized light which are equal in phase and intensity to each other.) having a wavelength $\lambda_a$ and the plane of polarization of which is inclined 45° with respect to the paper surface or a circular polarized light. This beam advances in such a manner that the S polarized light is separated in two directions by the fixed mirror and the P polarized light separated in one direction of the movable mirror by the polarizing beam splitter 6. The beam on the fixed mirror 2 side is reflected and thereafter reflected again by the polarizing beam splitter 6, and thence reaches as S polarized light the total reflection mirror 12. On the other hand, the beam moving towards the movable mirror 1 passes through the non-linear optical system 8 when a part thereof passes therethrough as P polarized light at the wavelength $\lambda_a$. The remaining component is converted here into a second higher harmonic wave $\lambda_b$ of S polarized light whereas two lights $\lambda_a$ and $\lambda_b$ have a uniform phase immediately after they have been emitted out of the non-linear optical system 8, as shown in FIG. 3 at a and b. The light $\lambda_a$ passes through the ⅛ wavelength plate 9 (which is the ⅛ wavelength plate for the beam $\lambda_b$ and does not act as the ⅛ wavelength plate for the light $\lambda_a$), reflected by the movable mirror 1 and again passes through the ⅛ wavelength plate 8 into an elliptical polarized light. On the other hand, the beam $\lambda_b$ likewise passes through the ⅛ wavelength plate 9 and is converted into a circular polarized light. When the light reflects between the non-linear optical system 8 and the movable mirror 1 and returns to the non-linear optical system 8, there occurs, other than a deviation in phase resulting from a difference of optical characteristics between the beam of the wavelength $\lambda_a$ of the wavelength plate 8 and the movable miror 1 and the beam of $\lambda_b$, a deviation in phase resulting from any flicker of atmosphere therebetween.

When the returning light $\lambda_a$ passes through the non-linear optical system 8, a second higher harmonic wave $\lambda_b'$ of the S polarized light again occurs.

The beam $\lambda_b'$ is matched in phase to the beam $\lambda_a$ when returned to the non-linear optical system 8, and the wavelength $\lambda_b$ is equal to each other. Accordingly, when the beam $\lambda_b$ and luminuous flux $\lambda_b'$ are interfered, a variation term of the interference fringe represents a phase variation difference ($\delta_a - \delta_b$) between the beam $\lambda_a$ and the beam $\lambda_b$ resulting from the flicker of the atmosphere. The returning beam is divided into two components perpendicularly intersecting each other by the polarizing beam splitter 11, detected as an interference signal having a phase difference of 90° by the photo-detectors $4_3$ and $4_4$ and discriminated in direction and detected by the signal processing system 5.

On the other hand, the P polarization component of the returning beam having the wavelength $\lambda_a$ which is not converted in wavelength even if it passes through the non-linear optical system 8 is divided into two parts by the beam splitter 13 together with the S polarization component, from the fixed mirror 2, reflected by the polarizing beam splitter 6, passed through the polarizers 15 and thereafter is detected as an interference signal having a phase difference of 90° by the photo-detectors $4_1$ and $4_2$. It is then discriminated in direction by the signal processing system 5 to obtain a phase variation $\delta_a$.

In the signal processing system 5, $\delta_b$ is obtained from $\delta_a$ and ($\delta_a - \delta_b$), and these measured values and the values $\lambda_a$ and $\lambda_b$ are put into the Formulae (5) and (6) for arithmetic calcualation to obtain a displaced measured amount of the movable mirror 1 with the error resulting from flicker of the atmosphere removed.

Figure 4:
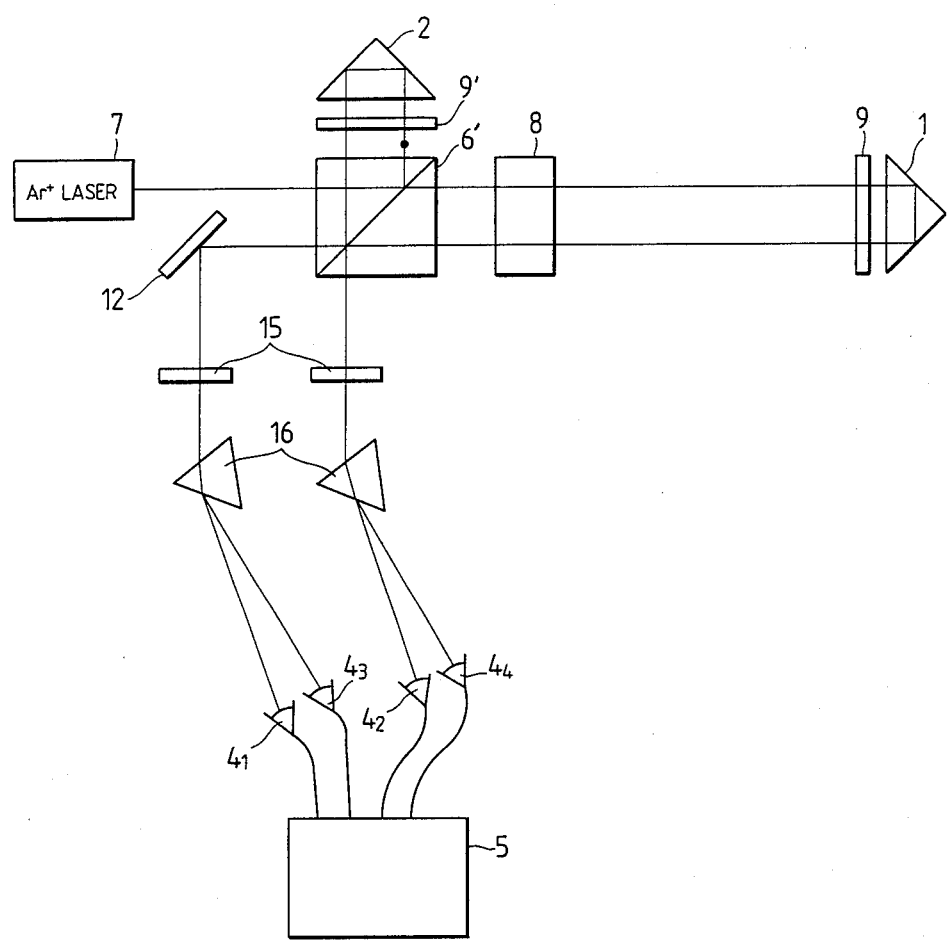
FIGS. 4 and 5 show light paths, respectively, of a two-wavelength light wave interference measuring apparatus according to another embodiment.

A modified form of the embodiment shown in FIG. 2 is shown in FIG. 4. Parts corresponding to those of the apparatus shown in FIG. 2 are indicated by the same reference numerals as those of FIG. 2. This embodiment is different from that of FIG. 2 in that a beam splitter 6' is used in place of the polarizing beam splitter 6 of FIG. 2. The function of the mirror 10 shown in FIG. 2, namely, the function for separating the basic wave and the second higher harmonic wave is effected by dispersion prisms 16. A ⅛ wavelength plate 9' (which does not act as a ⅛ wavelength plate with respect to the basic wave) arranged in front of a fixed mirror 2 is provided to convert a reflected beam from the fixed mirror 2 into an elliptic polarized beam and cooperate with the ⅛ wavelength plate 9 arranged frontwardly of a movable mirror 1 to impart a change in phase of 90° to a basic wave interference fringe signal. These two ⅛ wavelength plates are not indispensable for an optical system but practically required for adjustment of the optical system.

The operation of the FIG. 4 apparatus is similar to that of FIG. 2 and therefore will not be described.

In the embodiments shown in FIGS. 2 and 4, by the provision of the following two points, (i) Among the beams having two different wavelengths, one light is made as a second higher harmonic wave of the other light, and therefore, the frequencies of both lights strictly maintain the relationship of twice, and (ii) the second higher harmonic wave is again produced with respect to the returning beam, whereby a difference in phase variation between the two lights may be optically calculated, an error in the term of ($\lambda_a \delta_a - \lambda_b \delta_b$) in Formula (5) can be minimized.

Figure 5:
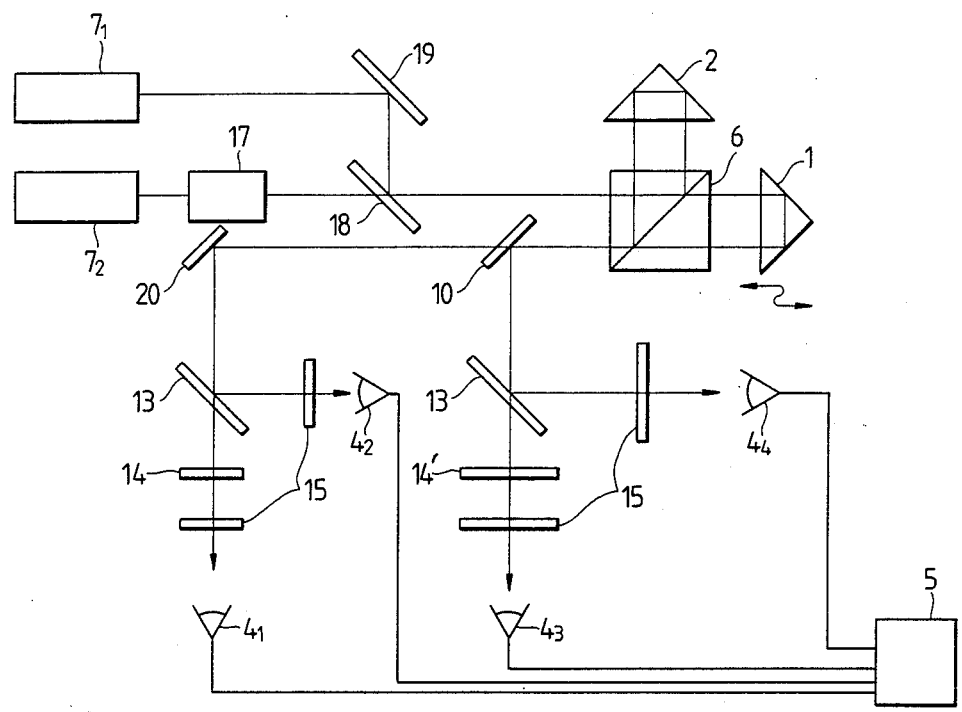

Furthermore, another embodiment is shown in FIG. 5. In this embodiment, a first light source $7_1$ ($\lambda_a = 633$ nm) comprising a Ne-Ne laser, for example, and a second light source $7_2$ ($\lambda = 488$ nm) comprising an AR+ laser, for example, are used. The beam from the second light source $7_2$ is made half in wavelength through a second higher harmonic wave generating optical system 17 ($\lambda_b = 244$ nm). This purpose is to make greater a difference a wavelength of a beam from the second luminuous flux source $7_2$ and that of the first beam source to make greater a difference in detection phase, thereby accurately removing errors in measurement. Beams from the light sources $7_1$ and $7_2$ pass through a reflection mirror 19 and a half mirror 18, and the beams are incident upon an interferometer comprising a movable mirror 1, a fixed mirror 2 and a polarizing beam splitter 6. The beams enter phase change detecting systems 13, 14, 14', 15, $4_1$, $4_2$, $4_3$ and $4_4$ similar to those shown in FIG. 2 through a filter mirror 10 for separating a basic wave from a second higher harmonic wave and a reflection mirror 20.

While in the foregoing, the present invention has been described using a Michelson's interferometer, it is to be noted that an interferometer used in the present invention is not limited to the interferometer as described.

According to the apparatus of the present invention, it is possible to remove an error in measurement resulting from a flicker of atmosphere in real time without monitoring atmospheric conditions of a light path at various positions, and a precise measurement in a nanometer order can be carried out. Accordingly, the apparatus according to the present invention can be effectively used at various places where a flicker of the atmosphere is present irrespective of indoor or outdoor.

What is claimed is:

1. A light wave interference displacement measurement apparatus which uses two beams of different wavelengths of coherent light comprising:

a light source (7) for causing two coherent light beams having a first wavelength $\lambda$ a and a second wavelength $\lambda$b, respectively, incident upon a common light path for measuring at least the length of said light path;

an optical element (6) for splitting at least one beam from said light source into a reference light path and a light path of length to be measured, and for combining the same;

a movable light reflector means (1) arranged in said light path of length to be measured to reflect the incident light on a substantial incident light path;

separation means (10, 6'), arranged in the vicinity of said optical element for splitting and combining, to separate reflected light from said movable light reflector means into separate beams of said first and second wavelengths, respectively;

a first light detector means (4) for detecting a phase difference $\delta a$ resulting from the combination of the reflected beam of the first wavelength from the movable light reflector means and the beam from the reference light path;

a second light detector means (4) for detecting a phase difference $\delta b$ resulting from the combination of the reflected beam of the second wavelength from the movable light reflector means and a reference beam; and signal processing means (5) for calculating, from the phase differences $\delta a$ and $\delta b$ detected by said first and second light detector means, an error resulting from an apparent moving distance of said movable light reflector means and a flicker of the atmosphere in order to detect the true displacement of said movable light reflector means.

2. A light wave interference displacement measurement apparatus which uses two beams of different wavelengths of coherent light as recited in claim 1, wherein said means for calculating determines true displacement $X_A$ in accordance with the formula:

$$X_A = \tfrac{1}{4}\pi\{\lambda a\ \delta a - (\lambda a\ \delta a - \lambda a\ \delta b)/(1-W)\}$$

wherein $W = (\omega_o^2 - \omega_a^2)/(\omega_o^2 - \omega_b^2)$
  $\omega_0$ is a constant determined by a medium of the light path
  $\omega_a$ is the frequency of wavelength $\lambda_a$
  $\omega_b$ is the frequency of wavelength $\lambda_b$.

3. A light wave interference displacement measurement apparatus as recited in claim 1 wherein the light source for causing two coherent light beams comprises two laser light sources of which oscillation wavelengths are $\lambda a$ and $\lambda b$.

4. A light wave interference displacement measurement apparatus as recited in claim 1 wherein the light source comprises a laser for emitting a beam of a first wavelength $\lambda a$, and means for generating a beam of a second wavelength $\lambda b$ of a higher harmonic wave of said first wavelength, said generating means superimposing the beam of the second wavelength $\lambda b$ on the beam of the first wavelength $\lambda a$.

5. A light wave interference displacement measurement apparatus as recited in claim 4 wherein said second light detector means directly detects a difference ($\delta a - \delta b$) between the phase difference $\delta a$ of the beam of the first wavelength and the phase difference $\delta b$ of the beam of the second wavelength.

* * * * *